United States Patent
Chan et al.

(10) Patent No.: US 11,403,326 B2
(45) Date of Patent: Aug. 2, 2022

(54) MESSAGE-BASED EVENT GROUPING FOR A COMPUTING OPERATION

(71) Applicant: International Business Machines Corporation, Armonk, NY (US)

(72) Inventors: Yuk L. Chan, Rochester, NY (US); Jia Qi Li, Beijing (CN); Lin Yang, Beijing (CN); Tian Wu, Beijing (CN); Lei Yu, Sleepy Hollow, NY (US); Hong Min, Poughkeepsie, NY (US); Fan Jing Meng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/110,460

(22) Filed: Dec. 3, 2020

(65) Prior Publication Data

US 2022/0179881 A1 Jun. 9, 2022

(51) Int. Cl.
*G06F 16/00* (2019.01)
*G06F 16/28* (2019.01)

(52) U.S. Cl.
CPC ................. *G06F 16/285* (2019.01)

(58) Field of Classification Search
CPC .................................................. G06F 16/285
USPC ........................................................ 707/737
See application file for complete search history.

(56) References Cited

U.S. PATENT DOCUMENTS

| | | | |
|---|---|---|---|
| 6,349,290 B1 * | 2/2002 | Horowitz | G06Q 40/02 705/42 |
| 7,506,195 B2 | 3/2009 | Takahashi et al. | |
| 7,742,875 B2 | 6/2010 | Li et al. | |
| 7,856,575 B2 | 12/2010 | Bock et al. | |
| 7,860,815 B1 | 12/2010 | Tangirala | |
| 8,065,336 B2 | 11/2011 | Armstrong et al. | |
| 8,229,953 B2 | 7/2012 | Kapuram et al. | |

(Continued)

FOREIGN PATENT DOCUMENTS

| | | |
|---|---|---|
| CN | 101325520 B | 8/2010 |
| CN | 103761173 A | 4/2014 |

(Continued)

OTHER PUBLICATIONS

Chen et al.; "Correlated Anomaly Detection From Large Streaming Data", BigData IEEE International Conference on, pp. 1-11, Dec. 10-13, 2018.

(Continued)

*Primary Examiner* — Alexandria Y Bromell
(74) *Attorney, Agent, or Firm* — Ryan, Mason & Lewis, LLP

(57) ABSTRACT

Aspects of the invention include determining whether a first log message written by an application during a first job is a message of interest based on a context of the first log message and a probability that the application writes the message for a same job as the first job. Calculating in response to determining that the first log message is a message of interest and by the processor, a correlation score based on intersecting tokens between the first log message and a second log message. Determining the first log message correlates to the second log message based on comparing the score to a threshold score. Modifying a system log of a mainframe to link the first log message to the second log message based on the correlation.

20 Claims, 7 Drawing Sheets

(56) References Cited

U.S. PATENT DOCUMENTS

| | | | |
|---|---|---|---|
| 8,495,429 B2 | 7/2013 | Fu et al. | |
| 9,086,944 B2 | 7/2015 | Lentile et al. | |
| 9,164,983 B2* | 10/2015 | Liu | G06F 40/232 |
| | | | 707/707 |
| 9,215,164 B2 | 12/2015 | Scharf et al. | |
| 9,225,730 B1 | 12/2015 | Brezinski | |
| 9,244,755 B2 | 1/2016 | Huang et al. | |
| 9,298,453 B2 | 3/2016 | Vangala et al. | |
| 9,354,961 B2 | 5/2016 | Nagura et al. | |
| 9,367,809 B2 | 6/2016 | Puri et al. | |
| 9,413,837 B2 | 8/2016 | Vaccari et al. | |
| 9,633,106 B1 | 4/2017 | Saurabh et al. | |
| 9,710,322 B2 | 7/2017 | Jewell et al. | |
| 9,734,005 B2 | 8/2017 | Ruan et al. | |
| 9,772,898 B2 | 9/2017 | Deshpande et al. | |
| 9,811,795 B1 | 11/2017 | Kearns et al. | |
| 9,891,983 B1 | 2/2018 | Dechiaro | |
| 9,984,060 B2 | 5/2018 | Bhattacharya et al. | |
| 9,984,148 B2 | 5/2018 | Lee et al. | |
| 10,042,613 B2 | 8/2018 | Castielli et al. | |
| 10,042,697 B2 | 8/2018 | Ahad | |
| 10,083,073 B2 | 9/2018 | Ambichl et al. | |
| 10,120,747 B2 | 11/2018 | Cunico et al. | |
| 10,133,568 B2 | 11/2018 | He et al. | |
| 10,140,287 B2 | 11/2018 | Dasgupta et al. | |
| 10,140,576 B2 | 11/2018 | Eldardiry et al. | |
| 10,142,357 B1 | 11/2018 | Tamersoy et al. | |
| 10,162,696 B2 | 12/2018 | Kogan-Katz et al. | |
| 10,169,731 B2 | 1/2019 | Brew et al. | |
| 10,193,533 B2 | 1/2019 | Chen et al. | |
| 10,270,668 B1 | 4/2019 | Thompson et al. | |
| 10,303,533 B1 | 5/2019 | Panov et al. | |
| 10,318,541 B2 | 6/2019 | Bingham et al. | |
| 10,339,457 B2 | 7/2019 | Ryckbosch et al. | |
| 10,346,229 B2 | 7/2019 | Tee et al. | |
| 10,346,758 B2 | 7/2019 | Natsumeda | |
| 10,402,255 B1 | 9/2019 | Niyogi | |
| 10,467,318 B2 | 11/2019 | Truitt et al. | |
| 10,523,520 B2 | 12/2019 | Aggarwal et al. | |
| 10,552,289 B2 | 2/2020 | Ilangovan et al. | |
| 10,585,774 B2 | 3/2020 | Chen et al. | |
| 10,616,038 B2 | 4/2020 | Kushmerick et al. | |
| 10,628,747 B2 | 4/2020 | Chen et al. | |
| 10,637,745 B2 | 4/2020 | Naous | |
| 10,664,535 B1 | 5/2020 | Hahn | |
| 10,673,721 B2 | 6/2020 | Hashimoto et al. | |
| 10,701,096 B1 | 6/2020 | Johnston et al. | |
| 2004/0249821 A1 | 12/2004 | Nies et al. | |
| 2011/0087924 A1 | 4/2011 | Kandula et al. | |
| 2011/0083123 A1 | 5/2011 | Lou et al. | |
| 2013/0124923 A1 | 5/2013 | Wang et al. | |
| 2014/0365575 A1 | 12/2014 | Spaven et al. | |
| 2016/0124823 A1 | 5/2016 | Ruan et al. | |
| 2016/0253229 A1 | 9/2016 | Sade et al. | |
| 2016/0307285 A1 | 10/2016 | Gallagher | |
| 2017/0013003 A1 | 1/2017 | Samuni et al. | |
| 2017/0228460 A1 | 8/2017 | Amel et al. | |
| 2018/0041500 A1 | 2/2018 | Menahem et al. | |
| 2018/0144041 A1 | 5/2018 | Chen et al. | |
| 2018/0211197 A1 | 7/2018 | Vosseler et al. | |
| 2018/0219723 A1 | 8/2018 | Scarpelli et al. | |
| 2018/0308001 A1 | 10/2018 | Doddala et al. | |
| 2018/0359530 A1* | 12/2018 | Marlow | H04N 21/4394 |
| | | | 707/707 |
| 2019/0073257 A1 | 3/2019 | Dasgupta et al. | |
| 2019/0114244 A1 | 4/2019 | Salunke et al. | |
| 2019/0188286 A1 | 6/2019 | Chan et al. | |
| 2019/0250970 A1 | 8/2019 | Gupta et al. | |
| 2019/0356533 A1 | 11/2019 | Vasseur et al. | |
| 2019/0391863 A1 | 12/2019 | Ofer et al. | |
| 2020/0076841 A1 | 3/2020 | Hajimirsadeghi et al. | |
| 2020/0084085 A1 | 3/2020 | Tucker et al. | |
| 2020/0104775 A1 | 4/2020 | Chintalapati et al. | |
| 2020/0117668 A1 | 4/2020 | Chamarajnagar | |
| 2020/0142954 A1 | 5/2020 | Mandalia et al. | |
| 2020/0167350 A1 | 5/2020 | Miller et al. | |
| 2020/0201701 A1 | 6/2020 | Wang et al. | |
| 2020/0226362 A1 | 7/2020 | Hu et al. | |
| 2020/0380408 A1* | 12/2020 | Sridhar | G06F 21/60 |
| | | | 707/707 |
| 2021/0064500 A1 | 3/2021 | Przestrzelski | |
| 2021/0306361 A1 | 9/2021 | Tanaka et al. | |
| 2021/0342313 A1 | 11/2021 | Riddell | |
| 2021/0382770 A1* | 12/2021 | Lu | G06F 11/079 |
| | | | 707/707 |

FOREIGN PATENT DOCUMENTS

| | | |
|---|---|---|
| CN | 105577440 B | 6/2019 |
| CN | 106293648 B | 11/2019 |
| CN | 107248927 B | 6/2020 |
| EP | 2863309 B1 | 11/2018 |
| KR | 101328328 B1 | 11/2013 |
| WO | 2015168141 A1 | 11/2015 |
| WO | 2017020973 A1 | 2/2017 |
| WO | 2017180666 A1 | 10/2017 |
| WO | 2020023787 A1 | 7/2019 |

OTHER PUBLICATIONS

Du, M. et al., "DeepLog: Anomaly Detection and Diagnosis from System Logs through Deep Learning," Session F2: Insights from Log(in)s CCS'17, Oct. 30-Nov. 3, 2017, Dallas, TX, USA, 14 pages.

Eldardiry et al.; "Multi-Source Fusion for Anomaly Detection: Using across-domain and across-time peer-group consistency checks", JoWUA Journal of, vol. 5, No. 2, pp. 39-58, Jun. 6, 2014.

Farschi et al.; "Anomaly Detection of Cloud Application Operations Using Log and Cloud Metric Correlation Analysis"; ISSRE IEEE 26th International Conference on, pp. 1-11, Nov. 2-5, 2016.

Gao et al.; "Modeling Probabilistic Measurement Correlations for . . . Distributed Systems", ICDCS IEEE 29th International Conference on, pp. 623-630, Jun. 22-26, 2009.

Leman Akoglu et al, "Graph based Anomaly Detection and Description: A Survey." Data Mining and Knowledge Discovery, vol. 29, No. 3 (2015): pp. 1-68.

List of IBM Patents or Patent Applications Treated as Related; Appendix P; Date Filed: Jan. 12, 2021; 2 pages.

Madireddy et al.; "Analysis and Correlation of Application I/O Performance and System-Wide I/O Activity", Argonne National Laboratory, pp. 1-12, Apr. 2017.

Peiris et al.; "PAD: Performance Anomaly Detection in Multi-Server Distributed Systems", Cloud IEEE 7th International Conference on, pp. 769-776, Jun. 27-Jul. 2, 2014.

Peng et al.; "CM-GANs: Cross-Modal Generative Adversarial Networks for Common Representation Learning", Cornell University Library, arXiv:1710.05106v2,pp. 1-13,Apr. 26, 2018.

Song, Lei; "Informative Correlation Extraction From and for Forex Market Analysis", Auckland University of Technology, Master's Thesis, pp. 1-73, May 2010.

U.S. Appl. No. 17/110,432, filed Dec. 3, 2020, Entitled: Multi-Source Data Correlation Extraction for Anomaly Detection, First Named Inventor: Yuk L. Chan.

U.S. Appl. No. 17/110,438, filed Dec. 3, 2020, Entitled: Correlation-Based Multi-Source Problem Diagnosis, First Named Inventor: Yuk L. Chan.

Yuk L. Chan et al., "Graph-Based Log Sequence Anomaly Detection and Problem Diagnosis," U.S. Appl. No. 17/110,535, filed Dec. 3, 2020.

Yuk L. Chan et al., "Integrating Documentation Knowledge With Log Mining for System Diagnosis," U.S. Appl. No. 17/110,430, filed Dec. 3, 2020.

Yuk L. Chan et al., "Log-Based Status Modeling and Problem Diagnosis for Distributed Applications," U.S. Appl. No. 17/110,513, filed Dec. 3, 2020.

Yuk L. Chan et al., "Message Correlation Extration for Mainframe Operation," U.S. Appl. No. 17/110,431, filed Dec. 3, 2020.

Yuk L. Chan et al., "Message-Based Problem Diagnosis and Root Cause Analysis," U.S. Appl. No. 17/110,458, filed Dec. 3, 2020.

(56) References Cited

OTHER PUBLICATIONS

Zhong et al.; "An Improved Correlation-Based Anomaly Detection Approach For Condition Monitoring Data Of ndustrial Equipment", ICPHM IEEE Inter. Conf. on, pp. 1-6, Jun. 20-22, 2016.

* cited by examiner

| 302 | 306 | |
|---|---|---|
| STC25375 | GSDMV21I | 0.6856342 |
| | IEE457I | 0.4823456 |
| | DSNJ002I — 304 | 0.3342124 |
| | DVG432I | 0.2345966 |
| | DSNI031I | 0.1823785 |
| STC27847 | HASP373 | 0.4826246 |
| | ICH70001I | 0.3968134 |
| | GSDMV20I | 0.2245688 |
| | ICH408I | 0.2058692 |
| JOB25683 | IEA989I | 0.9523456 |
| | IRR812I | 0.1235545 |
| | IEF196I | 0.6346624 |

EYUTS0003I  Topology *event* for *sysname* Complete - APPLID (*applid*) CICSplex (*plexname*)

Explanation

Topology Services has completed a communications endpoint event for the specified CICS® system, where:
event Identifies the event as one of the following:
    Connect A physical connection between the MAS (CICS system) and its maintenance point CMAS.
    Join A logical connection between the MAS (CICS system) and another CMAS.
    Disconnect A disconnection of the MAS (CICS system) from its maintenance point CMAS.
sysname Identifies the MAS name for the CICS system.
applid Identifies the APPLID of the CICS system.
plexname Identifies the CICSplex the CICS system is being processed for.

System action Processing continues.

User response None.

Module EYU0TSSC, EYU0TSSE, EYU0TSSJ

Destination Console, job log, EYULOG

MESSAGE-BASED EVENT GROUPING FOR A COMPUTING OPERATION

BACKGROUND

The present invention generally relates to programmable computing systems, and more specifically, to message-based event grouping for a computing operation.

Mainframe computing systems are high-performance computers that have a hierarchy that includes a number of different computer nodes, such as servers, switches, and storage systems. An organization will typically use a mainframe to host commercial databases, transaction servers, and applications that require a greater level of processing power and security than found on a standard computing device. The programs operating on the mainframe communicate with each other by sending data to each other in messages rather than by calling each other directly. The messages are sent from a sender program and placed in queues to allow the recipient program to run independently of the sender. The recipient program retrieves the message from the queue in due course.

SUMMARY

Embodiments of the present invention are directed to computing-based methods, computing systems, and computer program products for message-based event grouping for a computing operation. A non-limiting example computer-implemented method includes determining whether a first log message written by an application during a first job is a message of interest based on a context of the first log message and a probability that the application writes the message for a same job as the first job. Calculating in response to determining that the first log message is a message of interest and by the processor, a correlation score based on intersecting tokens between the first log message and a second log message. Determining the first log message correlates to the second log message based on comparing the score to a threshold score. Modifying a system log of a mainframe to link the first log message to the second log message based on the correlation.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 illustrates a job sequence, messages generated as a result of the sequence, and probabilities that each message is generally generated with the job sequence in accordance with one or more embodiments of the present invention.

FIG. 5 illustrates a log message in accordance with one or more embodiments of the present invention;

Figure 1:
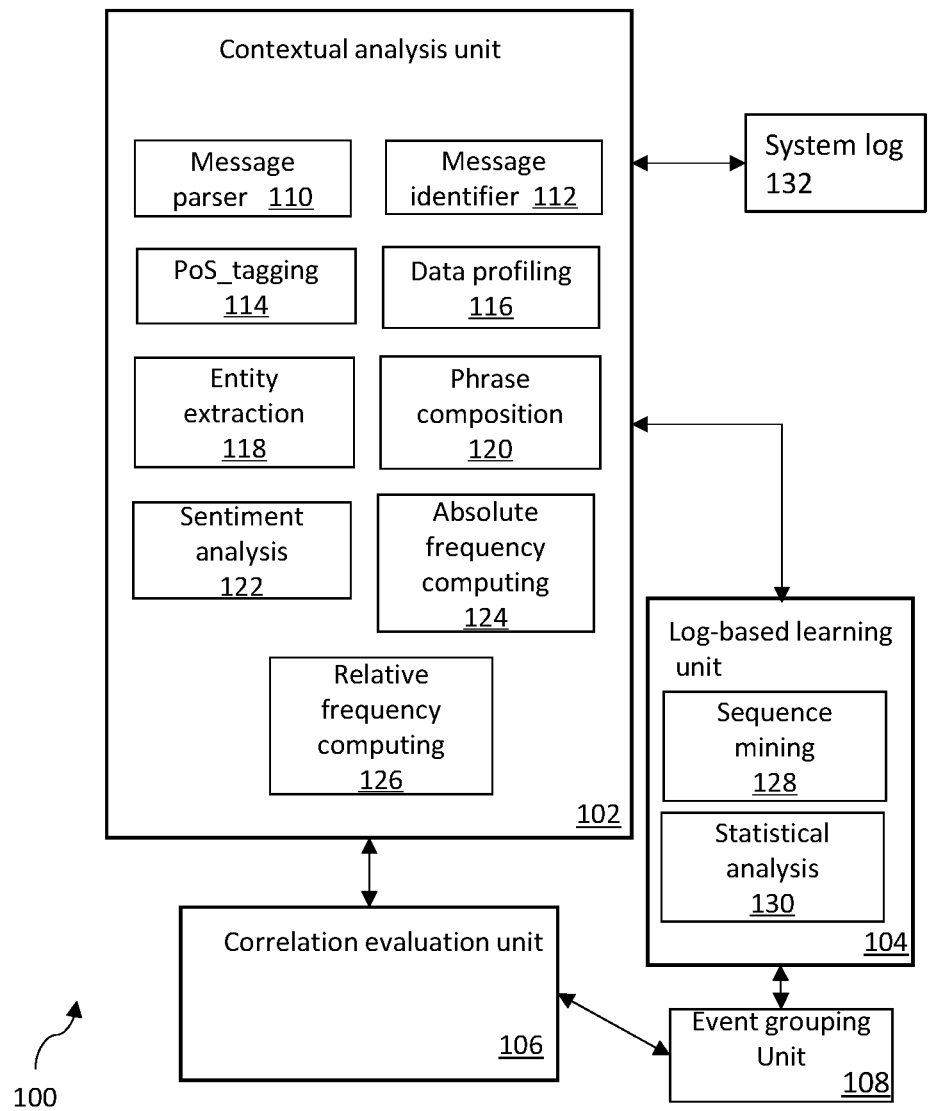
FIG. 1 illustrates a block diagram of components of a system for message-based event grouping in accordance with one or more embodiments of the present invention.

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products for assisting root cause error analysis by grouping together log messages based on a contextual analysis.

System administrators can determine a computing system's performance by monitoring log messages written by applications, operating systems (e.g., job management subsystem, and workload management subsystem) and device management systems (e.g., network management subsystem and storage management subsystem) running on the mainframe. The terms "application", "operating system", and "device management system" will be collectively referred to as "application" from here on, unless a specific type is specified. However, applications can often generate multiple log messages for a single event. Additionally, for a multi-purpose mainframe, multiple applications can write log messages at the same time related to a common event. For example, a database application can be started by a job management subsystem, access a storage device through the device management subsystem, and be managed by a workload management subsystem. Furthermore, an application server can make calls to the database application. Each of these applications can write log messages related to a common event. As the system administrator views log messages independently, it can be difficult for the administrator to ascertain the relationships between different log messages.

In some computing systems, the operating system can provide a centralized log management system, where all applications can write their logs to. For example, the Operlog or Syslog on the z/OS operating system, or the Linux operating system. Applications can choose to write logs to the centralized log management system, their own log management system, or both. Furthermore, these applications can be running on different machines or different types of computing environments or operating systems distributed across a network. As the system administrator views log messages independently, it can be difficult for the administrator to ascertain the relationships between the different log messages.

Conventional tools and systems perform various grouping methods to assists system administrators. However, each of these methods requires the system administrator to have an in-depth knowledge of the complex information technology environments and their operation data. The system administrator also needs a detailed grasp of the characteristics of the current operating system as well as an understanding of any previous analysis of similar log messages.

One or more embodiments of the present invention address one or more of the above-described shortcomings by providing computer-implemented methods, computing systems, and computer program products that group log messages together by event by learning a context of the log messages. The context of each of the log messages are identified, and the messages are grouped together based on a semantic based statistical analysis of the contexts. Therefore, the system administrator does not require prior knowledge of a system's messaging behavior, and the messages having a similar context are grouped together for the system administrator. If one of the messages of a group indicates an anomaly, the system administrator can review each message to analyze the event and identity the root cause error at a node of the mainframe. An error is an instance upon which an application at a node of the mainframe is not functioning properly.

Turning now to FIG. 1, a system 100 for message-based event grouping is generally shown in accordance with one or more embodiments of the present invention. The system 100 includes a contextual analysis unit 102 to extract contextual information (e.g., mainframe terminologies, descriptive nouns or phrases of events) based on entity extraction, phrase composition, sentiment analysis, and statistical analysis over the message templates and the runtime log messages. The system 100 further includes a log-based learning unit 104 to learn runtime behavior of messages from different workflows using sequence mining and statistical analysis to enrich the contextual description of the log messages. The system 100 further includes a correlation evaluation unit 106 to compare and compute weighted correlation scores between log template and runtime log messages. The system 100 further includes an event grouping unit 108 to group log messages with similar contexts and create a knowledge graph.

The contextual analysis unit 102 can identify one or more messages of interest. A message of interest is a log message that suggests a high probability of there being an error or error condition. To identify a message of interest, the contextual analysis unit 102 retrieves one or more log messages by an application running on the mainframe. In some embodiments of the present invention, the contextual analysis unit 102 can retrieve the log messages from the mainframe's system log 132. The contextual analysis unit 102 preprocesses a retrieved log message and applies natural language processing (NLP) techniques to derive a context of the log message. The contextual analysis unit 102 includes a message parser unit 110 that performs a process of tokenization (sometimes referred to as text segmentation or lexical analysis) of the log message to separate the log message text into a list of tokens. The individual tokens can include, for example, individual words, phrases, sections, and sentences. The message parser unit 110 can further remove noisy data by performing a clean stopword technique to remove stopwords from the text string of a log message. Stopwords are words or phrases that provide little value to deriving the context of a log message. For example, commons stopwords that can be filtered out of the strings include "is", "an", and "the". The message parser unit 110 can apply various techniques to determine whether a word or phrase is a stopword. For example, the message parser unit 110 can access a library of stopwords, compare the entries in the library to the words contained in the log message, and remove the stopwords as defined by the dictionary.

The message parser unit 110 can also perform a stemming technique or a lemmatization technique on the tokens that remain after the stopwords have been removed. Stemming refers to the heuristic technique of removing the end (e.g., the suffix) of a word to reach a common base form. For example, the "participated", "participant", and "participating" can each be reduced to "partipat" by removing the end of the words. Lemmatization is a technique that applies the use of vocabulary and a morphological analysis of the words to determine the common base form. The message parser unit 110 can further convert the remaining tokens into a word vector. A word vector is a numeric representation of the respective entity types of the remaining tokens and denotes their semantic meaning. Converting the log messages into word vectors assists with the statistical analysis of the log messages.

The contextual analysis unit 102 further includes a message identifier unit 112 for identifying the log message. Each log message includes a message identifier that describes the type of message and the source of the message. For example, the message identifier can be an alphanumeric string. After the message parser unit 110 has tokenized the log message, the message identifier unit 112 can detect the message identifier and identify the log message by comparing the message identifier to an operating system-specific table or dictionary of message identifiers. The operating system-specific table or dictionary can include a standard format of the log message. The message identifier unit 112 can further compare the format of the message to the standard format to verify the message's identity.

The contextual analysis unit 102 further includes a part of speech tagging unit 114 and a data profiling unit 116. The part of speech tagging unit 114 can annotate tokens based on a definition and a context of the word within the log message. For example, the part of speech tagging unit 114 can annotate a token with the label "program", "component", "noun", "verb", or "adjective". The part of speech tagging unit 114 can determine which labels to choose based on a dictionary, an ontology, or rules. In some instances, the contextual analysis unit 102 is executed by machine learning circuitry or a neural network. In these instances, the part of speech tagging unit 114 can be trained to annotate the tokens. It should be appreciated that in many instances, operating systems apply specialized definitions of words or phrases. Therefore, the part of speech tagging unit 114 can annotate the token with labels with respect to a particular operating system. For example, "ADR297I CHECK-POINTED DATA SET dsname IS SELECTED FOR PROCESSING" is a message that will be parsed into tokens of Words or Phrases. Special token such as "ADR297I" is a message identifier for this message. "CHECKPOINT DATA SET" is a phrase that will be processed as a single entity, and "PROCESSING" is a word that will be processed as a single entity. "IS" and "FOR" will be ignored during processing because it's a general phase that appears in the language. "dsname" is a variable that can have different or same values at different occurrences of messages that has same message identifier "ADR297I", and it's a noun.

The data profiling unit 116 can further analyze the tokens to discover entities based on a statistical analysis of the text. The statistical analysis can be used to determine a relative importance of each token. For example, the data profiling unit 116 can determine the frequency of a token in the log message relative to the other tokens in the message. The data profiling unit 116 can further determine the frequency of a token relative to other log messages. The data profiling unit 116 can annotate a token to indicate the frequency that a token appears in a log message. The frequency of a token can be indicative of the importance of the token. For example, once the contextual analysis unit 102 has removed unhelpful tokens, a token's high frequency can be indicative of its importance to the context relative to other tokens.

The contextual analysis unit 102 further includes an entity extraction unit 118 to detect specific entities. Log messages contain specific tokens that provide more information regarding a context than other tokens. The entity extraction unit 118 can be trained to detect tokens that have higher importance than other tokens. For example, in the context of a mainframe operation system, CICS® (Customer Information Control System) is a transaction processing system of the IBM z/OS® operating system. The identity of the transaction processing system that wrote the message is important information to determine the context of the log message. Therefore, if the token "CICS" was found in the log message, the entity extraction unit 118 would annotate the token to reflect the importance. Additionally, high importance token within a message can be predefined. The definition could be based on the position of a token in the message or based on specific syntax for the message and extracting the token based on the syntax.

The contextual analysis unit 102 further includes a phrase composition unit 120 for determining a context of the message. The phrase composition unit 120 analyzes the log message, including the tokens, annotations, and any statistical analysis to further recognize the context of the log message. In particular, the phrase composition unit 120 reviews the morphology, syntax, and logical semantics of the log message to help determine its context. In some embodiments of the present invention, the contextual analysis unit 102, as any other unit in the system 100 can be executed by machine learning circuitry or a neural network. The phrase composition unit 120 can be trained to recognize the morphology, syntax, and logical semantics to predict a context of the log message.

Figure 2:
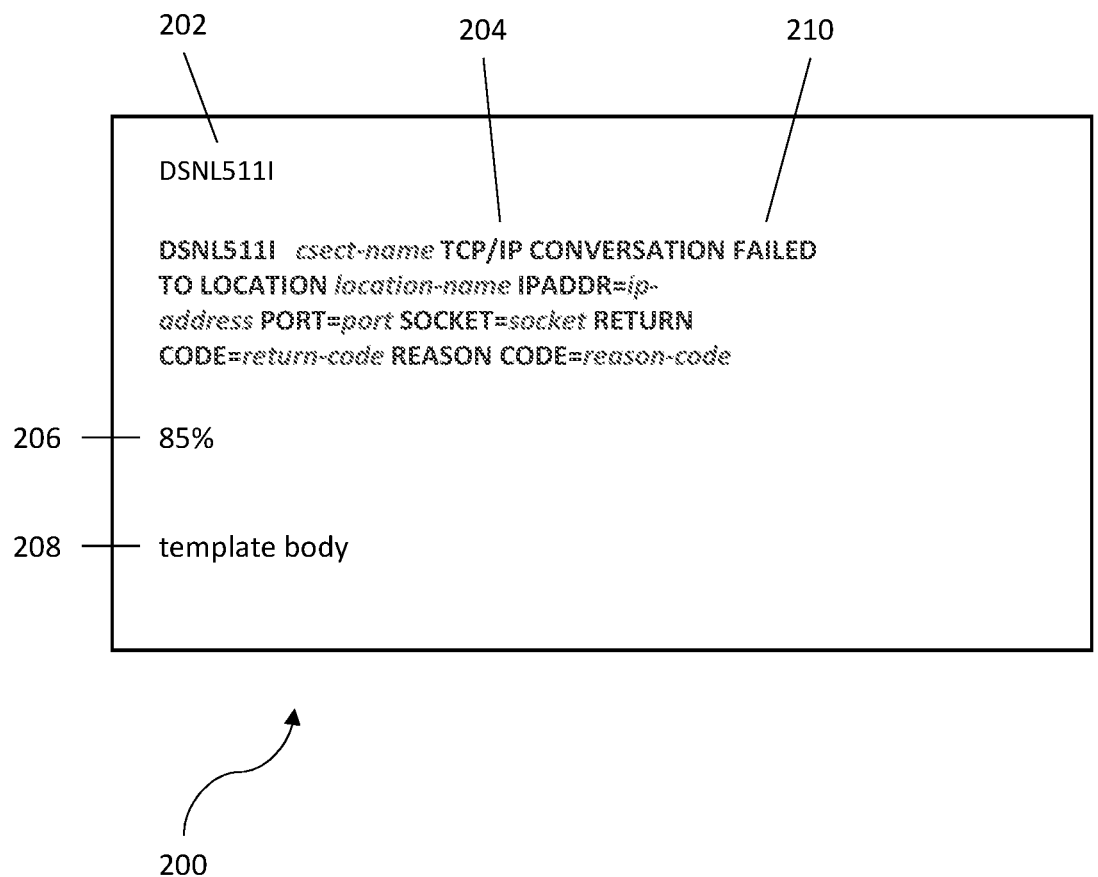
FIG. 2 illustrates a display describing a probability that a log message suggests an error or error condition at a node of a mainframe in accordance with one or more embodiments of the present invention.

The contextual analysis unit 102 further includes a sentiment analysis unit 122. The sentiment analysis unit 122 searches the log message for keywords to determine the sentiment of the log message. In some embodiments of the present invention, the sentiment is with respect to a particular job of a job sequence. The sentiment describes whether the system is working properly or if there is a probability of an error or error condition. For example, the sentiment analysis unit 122 can look for words such as "initiated" or "completed" to determine that the log message indicates a positive sentiment. The sentiment analysis unit 122 can also look for words such "timeout" or "blocked" as indicators that the log message (e.g., message of interest) is or is describing an anomaly. With reference to FIG. 2, the sentiment analysis unit 122 can generate a display 200 on a graphical user interface for a user. The display 200 includes the message identification 202, the message template 204, a calculated percentage that the log message suggests an error or error condition 206, and the portion of the log message used to determine whether an error or error condition is present 208.

Referring to FIG. 2, the word "FAILED" 210 can be used to determine the sentiment. As multiple message templates are associated with different messages, keywords that are indicative of sentiment can be collected from multiple message templates. The keywords can be ranked in terms of relativity of positive and negative sentiment. For example, a developer or subject matter expert can assign a binary status of "positive" or "negative" to a keyword, or assign a corresponding 100% and 0% to the keyword. In another example, given four keywords "completed successfully", "completed with warning", "terminated abnormally" and "completed with error", the developer or subject matter expert can assign different percentages. For example, "completed successfully" can be assigned 0% probability or an error or error condition, "completed with warning" can be assigned 70%", and "terminated abnormally" and "completed with error" can both be assigned 100%.

The contextual analysis unit 102 further includes an absolute frequency computing unit 124 and a relative frequency computing unit 126. The absolute frequency computing unit 124 calculates the relationship of the token across all the message templates. In one embodiment, the absolute frequency can be calculated using the number of message templates that a token appears, divided by the total number of templates. Therefore, if a token appears twice in a message template, it is only counted once for each template. The relative frequency calculates the relationship of the token with the template. In one embodiment, the relative frequency can be calculated using the number of instances a token appears in the message template divided by the number of tokens in the message template. In another embodiment, the relative frequency can be calculated using the number of instances of a token appears in the runtime log messages with the same message identifier divided by the number of possible values of the tokens in the runtime log messages with the same identifier. For example, the relative frequency can the number of instances a token appears in a pair of log messages. These statistical calculations are used to weight the importance of a token as an indicator for the correlation of the two log messages if both log messages have the same token. In some embodiments of the present invention, the statistical calculations are used to weight the importance of a static value in the template and possible values of the variables. In another embodiment of the present invention, the calculated weight can be adjusted to a higher weight for special tokens in the message template, or variables in the message template. For example, alphanumeric variables can be given a 150% higher weight adjustment because they could be an identifier of a work unit, such as identifier of a transaction type, or application name. This identifier of the work unit is useful to determine the correlation between two runtime log messages. In some embodiments of the present invention applies the absolute frequency (AF) and the relative frequency (RF) to calculate a weighted similarity for a token between two messages (msg) using the following expression:

$$weight_i = \text{normalize}\left(AF_i \times \log\left(\frac{AF_i}{RF_i}\right)\right), \quad (1)$$

where the normalize function is used to normalize the weight to a value between 0 and 1.

The system 100 also includes a log-based learning unit 104 for determining a probability that the log message suggests a high probability of an error or error condition.

The log-based learning unit 104 includes a sequence mining unit 128 for detecting job sequences executed on the mainframe. Referring to FIG. 3, the sequence mining unit 128 can retrieve a job sequence 300 from a system log 132 of a mainframe. Each job is identified by a job identification code 302. FIG. 3 includes job STC25375,STC27847, and JOB25683, which these jobs can be executed in parallel or one executed after another sequentially. Each job includes a set of messages written as a result of executing the job. For example, job STC25375 includes a message set 304, which includes messages GSDMV21I, IEE457I, DSNJ002I, DVG432I, and DSNI031I. The statistical analysis unit 130 compares the messages generated for multiple instances of a job. The statistical analysis unit 130 then determines the number of instances each message has been written for a job. The statistical analysis unit 130 then calculates a probability that each message is written for a job. For example, referring to FIG. 3, there is a 68.56342 percent that message GSDMV21I 306 is written during the execution of job STC25375. The log-based learning unit 104 can use a job-specific threshold value to determine whether the probability suggests an error or error condition. For example, if the threshold was fifteen percent, the presence of message IRR812I would suggest an error as there is only a twelve percent probability that message IRR812I is written during job JOB25683. In some embodiments, the log-based learning unit 104 learns simultaneously as the mainframe is operating and updates the probabilities in real-time.

The system 100 also includes a correlation evaluation unit 106 to determine a correlation score between at least two log messages. The correlation evaluation unit 106 can compare two log messages for their correlation based on the tokens identified by the contextual analysis unit 102 for both msg_one and msg_two, similarity between the tokens and words in the token between msg_one and msg_two, and the weight of the token. In some embodiments of the present invention, the correlation evaluation unit 106 can implement the following expression:

$$\text{score}(\text{msg\_one}, \text{msg\_two}) = \frac{\text{intersection}}{\text{len}(.\text{msg\_one.tokens}) + \Delta}, \quad (2)$$

where "intersection" describes the overlap of tokens in msg_one and msg_two as described by equation 3. The intersection can be determined by comparing each token from msg_one one by one with msg_two.

$$\text{intersection} = \text{intersect}(\text{msg\_one.token1}) + \ldots + \text{intersect}(\text{msg\_one.tokenN}) \quad (3)$$

where intersect(token) describes the amount of intersection between words in one token from msg_one, and words in all tokens in msg_two as described by equation 4.

$$\text{intersect}(\text{token}) = \frac{\text{len}(\text{words}(\text{token}) \cap \text{words}(msg2.token1)) + \ldots + \text{len}(\text{words}(\text{token}) \cap \text{words}(msg2.tokenN))}{\text{len}(\text{words}(\text{token}))}$$

where msg.tokens is an array of tokens in msg, (i.e., msg.token1, msg.token2 msg.tokenN). This array is produced by the contextual analysis unit 102. The len(array) is the number of elements in the array. The correlation evaluation unit 106 can count the number of elements. For example, msg.tokens can have an array (msg.token1, msg.token2, ... msg.tokenN), which has N elements. A token can be one word of phrase (multiple words), and it's a generalized reference to any one of token1, token2 ... or tokenN. Words(token) is an array of words in the token. For example, for the token "Checkpoint Data Set", the array is be (Checkpoint, Data, Set). "Array∩Token" describes an array of intersecting elements between "Array" and "Token". For example, for the array "Checkpoint Data Set Checkpoint" and the token "Checkpoint", the array is "Checkpoint Checkpoint".

The correlation evaluation unit 106 can evaluate the correlation between message templates in the log message documentation, and/or between runtime log messages. If correlation score considers only documentation, the correlation score between messages template can be pre-generated and ready to be used for the grouping of related runtime logs. If correlation score considers the value of variables in the runtime logs, the stage 1 of correlation score of the message template can be pre-generated. At runtime, the values of the variable analyzed and merged with the correlation score from stage 1.

The calculated correlation score can be compared to a threshold correlation score. If the calculated correlation score is greater than the threshold correlation score, there is a correlation between the two log messages. If the calculated correlation score is less than the threshold correlation score, there is no correlation between the two log messages. The two log messages can be any two log messages stored in the system log 132, upon which a correlation has not been currently calculated.

The system 100 includes an event grouping unit 108 for grouping correlated log messages. In some embodiments of the present invention, the event grouping unit 108 builds a knowledge graph on top of the mainframe's system log 132. The knowledge graph represents a collection of interlinked descriptions of correlated log messages. In some embodiments, the event grouping unit 108 links correlated log messages by writing an indicator bit in an index vector associated with a log message. The dimension of the index vector can be equivalent to the number of log messages in the system log 132. Each log message can be associated with a position on the index. For example, if a first log message is correlated with a third and fifth log message, the first log message's index vector will include a respective indicator bit at the third and fifth position of the index.

The system log 132 is a computer file stored on the mainframe and contains a record of the mainframe's operating system events that indicate how the mainframe's operated. An administrator can access the system log 132 to review informational, error, and warning events related to the mainframe's operating system. By reviewing the system log 132, the administrator can identify the root cause node of an error.

The system 100 can receive an input from a user to view a target log message. Upon identifying the target log message, the system 100 can traverse the target log message's index vector and determine if the log message is correlated with any other log message. In the event that the target log message is correlated with any other log messages, the system 100 can retrieve the correlated message(s), regardless of whether the user has requested the correlated message(s). In this sense, the user is provided with each log correlated log message related to an event. Therefore, even if log messages were written by different nodes of a mainframe, the user is provided each log message for an event.

The phrases "neural network" and "machine learning" broadly describes a function of electronic systems that learn from data. A machine learning system, engine, or module can include a machine learning algorithm that can be trained, such as in an external cloud environment, to learn functional relations between inputs and outputs that are currently unknown. In one or more embodiments, machine learning functionality can be implemented using the system 100, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The system 100 can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the system 100 that carry electronic messages between simulated neurons are provided with numeric weights that correspond to the strength or weakness of a given connection. During training, The weights can be adjusted and tuned based on experience, making the system 100 adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Figure 4:
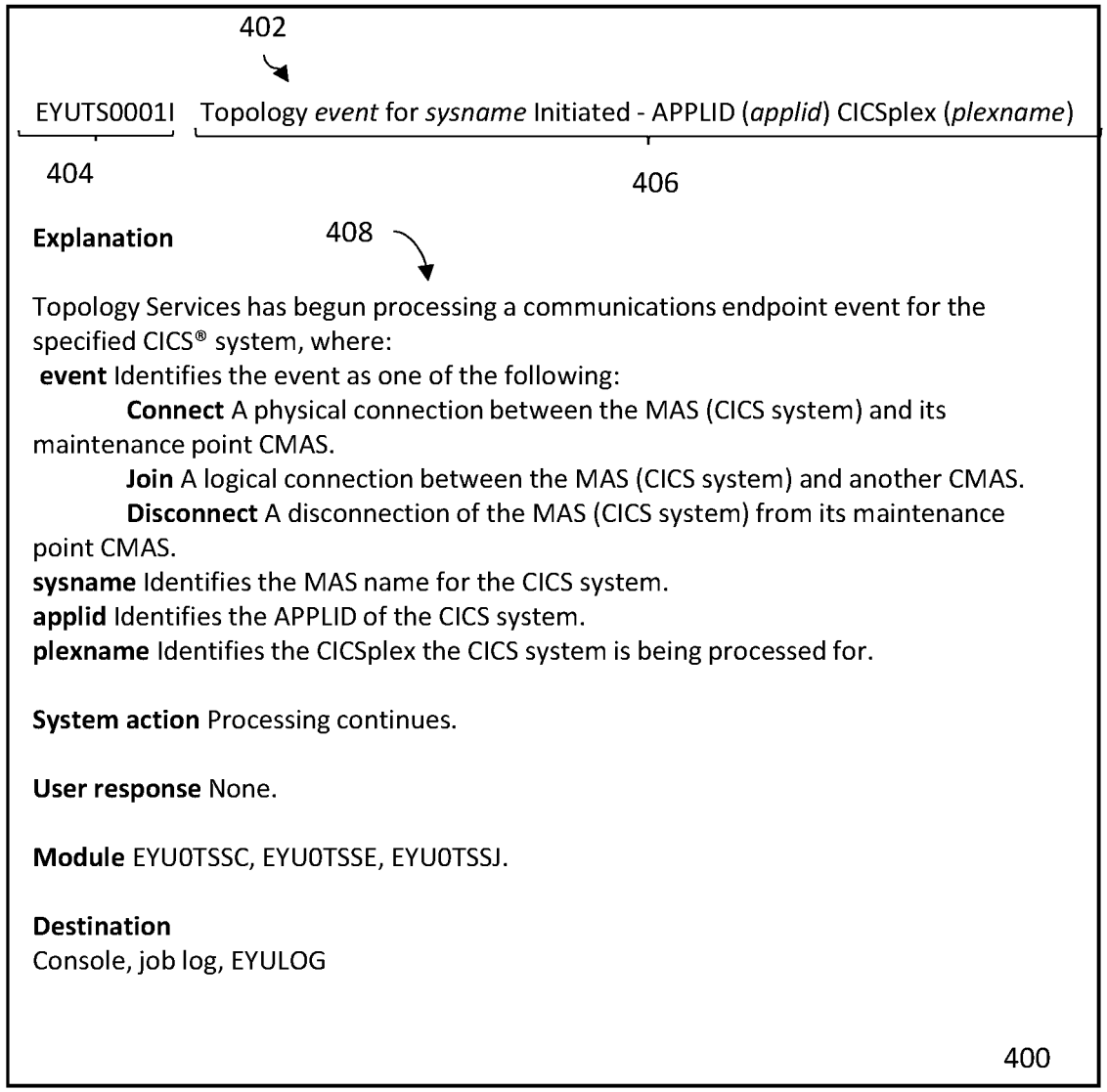
FIG. 4 illustrates a log message in accordance with one or more embodiments of the present invention.

Referring to FIG. 4, a template for a log message 400 and a narrative explanation is shown. The log message 400 includes a message template 402, which includes a unique message identifier 404 and a message text 406. The message text 406 includes the variables "event", "sysname", "applid," and "plexname" of the log message. Applications writing logs can have two artifacts: runtime logs that are generated when an application is running, and documentation for the logs. Some applications can assign a unique message identifier 404 to the log message. If the same log message generation code is executed twice, then the same code will produce two log message instances with the same unique message identifier 404. These two log message instances will show up twice in the log management system with a respective timestamp for when each log message instance was generated. An application can also retrieve and provide documentation 408 for log messages based on the unique message identifier 404. The message identifier allows unique identification of the specific message template.

FIG. 5 illustrates a log message 500 that is correlated with the log message shown in FIG. 4. FIG. 4 illustrates the log message 400 for initiation of the topology event, and FIG. 5 illustrates the log message 500 for completion of the topology event.

In some instances, an application may write log messages without providing a message identifier. The log management system or other post processing tool can extract message template using the runtime logs using message template mining algorithm such as the Drain Algorithm for Log Parsing. The runtime log can include multiple similar messages instances, and these message instance will be associated with the same template. For message instances that are vastly different, the messages are associated with different message templates. For example, "Application A started at 8:10 pm", "Application B started at 10:20 pm", "Database C is terminated successfully", "Database D is terminated successfully" are four log message instances. When analyzing these log message instances, two templates "Application <label 1> started at <timestamp 1>" and "Database <label 1> is terminated successfully" can be generated. For these templates, "label 1", "label 2" and "timestamp 1" are the variables in the message. Each of these templates can be assigned a unique template identifier, such as "Msg01" and "Msg02", where these unique template identifiers can be propagated and assigned to the runtime log messages. In the herein application, a message's template refers to one or both template provided with documentation and/or messages that requires message template mining. Message identifier will refer to one or both the message identifier from the documentation and/or the template identifier from the message template mining. Furthermore, references to log messages include one or both the log message template and/or runtime log messages unless specifically clarified.

Figure 6:
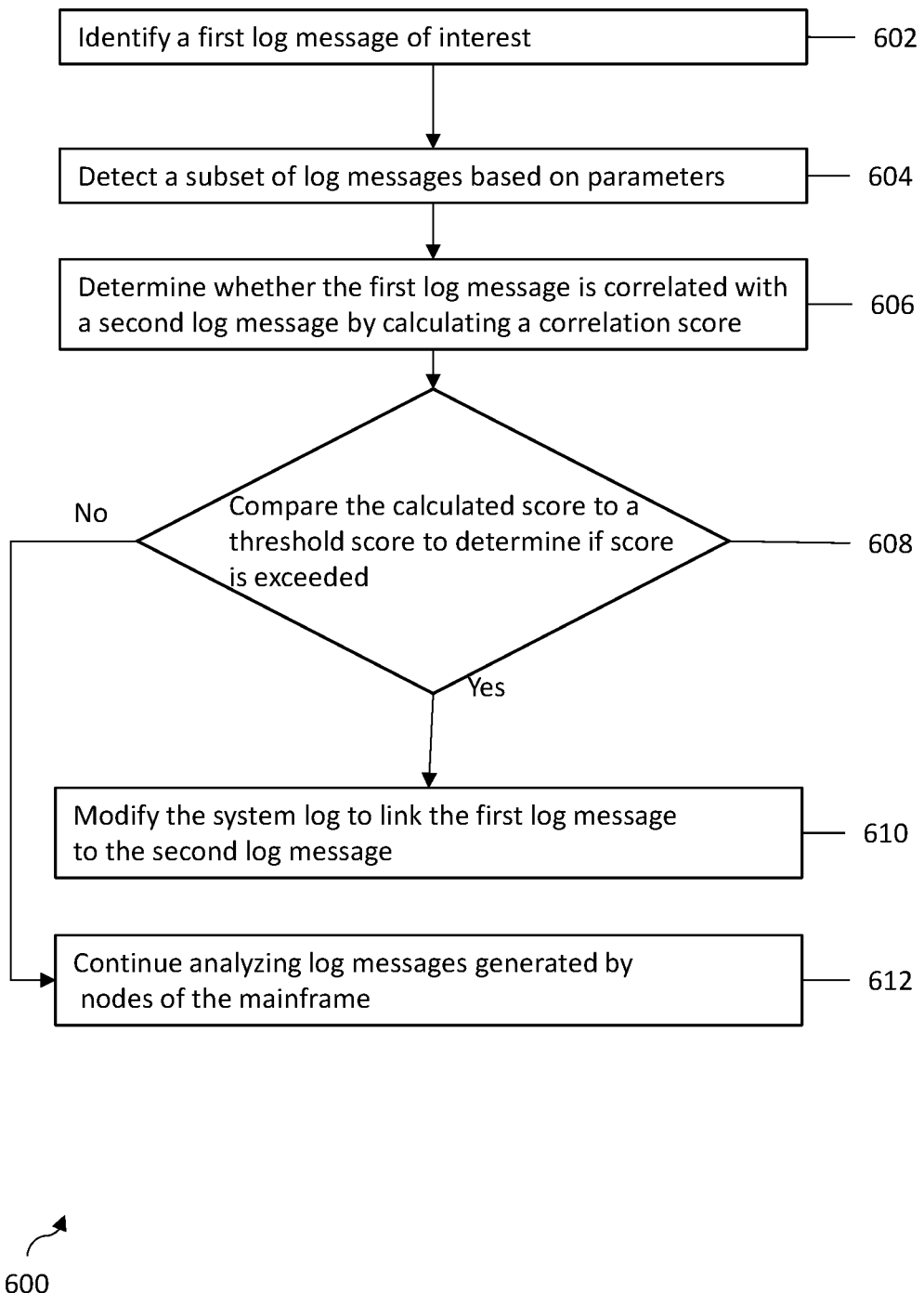
FIG. 6 illustrates a flow diagram of a process for grouping log messages in accordance with one or more embodiments of the present invention.

Referring to FIG. 6, a flow diagram of a process 600 for grouping log messages is illustrated in accordance with one or more embodiments of the present invention. It should be appreciated that all or a portion of the processing shown in FIG. 6 can be performed by a computer system, such as system 100 of FIG. 1. At block 602, a first log message of interest can be identified. A message of interest can be identified in numerous ways, including through the various functions performed by the contextual analysis unit 102, or the message of interest can be selected manually by a user. In some embodiments of the present invention, the contextual analysis unit 102 can semantically analyze a first log message written by an application running on a node of a mainframe to determine whether it is an anomaly. The contextual analysis unit 102 can parse the text of a log message to divide the text into tokens. The contextual analysis unit 102 can then identify different parts of speech, and annotate the tokens with labels identifying the parts of speech and mainframe-specific terminology. Based on the tokenization, the contextual analysis unit 102 can further identify the message based on detecting the message identification. The contextual analysis unit 102 analyzes the morphology, syntax, and logical semantics of the text of the log message to determine a phrase composition of the log message. The contextual analysis unit 102 can also perform a sentiment analysis by identifying keywords that suggest that there is a high probability of an error at a computing node of the mainframe. The contextual analysis unit 102 can further perform absolute frequency calculation and a relative frequency calculation. The absolute frequency computing unit 124 calculates the relationship of the token across all the message templates. The relative frequency calculates the relationship of the token with the template. The contextual analysis unit 102 uses this information to determine a context of the log message as to whether the message suggests that a high probability of an error has occurred at a node of the mainframe.

The contextual analysis unit 102 can perform its functionality as the mainframe is operating. Therefore as log messages are stored in the mainframe's system log 132, the contextual analysis unit 102 can retrieve each log message and perform its function in real-time.

The log-based learning unit 104 can calculate a probability that the message would appear for a job. The log-based learning unit 104 can be trained using a statistical analysis of job sequences and associated messages. A job is a unit of instructions executed by an application. During an execution of a job, log messages are written by the application executing the job. The log-based learning unit 104 can determine a probability that a message is written during a job based on previously executed jobs. For example, if a message is always written, then the probability is one hundred percent. If a message is not written each time, the percentage is lower. An administrator can establish a threshold probability that the appearance of a log message suggests a high probability of an error. In addition, the log-based learning unit 104 can detect the absence of a log message. For example, if a log message is written at a probability greater than a pre-determined threshold, the log-based learning unit 104, the log-based learning unit 104 can determine whether the absence of the log message suggests a high probability of an error at a computing node.

In some embodiments of the present invention, the contextual analysis unit 102 and the log-based learning unit 104 can determine whether a context of a log message and its presence suggests a high probability of an error. The contextual analysis unit 102 can analyze the context and determine whether there is a high probability of an error at a node. For example, the contextual analysis unit 102 can determine whether the presence of a keyword indicates a high probability of an error, or whether the log message has a threshold number of tokens in common with a log message that has been previously determined to suggest a high probability of an error. The log-based learning unit 104 can determine whether the presence of a message suggests a high probability of an error. For example, the log-based learning unit 104 can compare the probability that the message appears to a threshold probability. If, for example, the probability is less than the threshold probability, the log-based learning unit 104 can determine that the log message suggests a high probability of an error. If the log-based learning unit 104 determines that the probability is equal to or greater than the threshold probability, the contextual analysis unit 102 can determine whether the context suggests a high probability of an error at a computing node.

At block 604, the correlation evaluation unit 106 can detect a subset of log messages to be evaluated for correlation. The subset of log messages can be based on log messages that include one or more pre-defined or determined parameters. In some embodiments of the present invention, the parameters can be manually provided by a user For example, the user can indicate that all log messages that are written within a time interval of ten minutes before and ten minutes after the message of interest is written should be included in the subset. In another embodiment of the present invention, the parameters can be dynamically determined. For example, the parameters can include messages that are moderately abnormal, such as messages with anomaly score of 60% of above, and written two hours before and two hours after the message of interest is written.

At block 606, the correlation evaluation unit 106 can determine whether the log message correlates with another log message in the system log 132, based on calculating a correlation score. The correlation evaluation unit 106 compares intersecting tokens of the messages to calculate the correlation score. Intersecting tokens are tokens that appear in both log messages. The correlation evaluation unit 106 further compare the correlation score to a threshold correlation score.

At block 608, the correlation evaluation unit 106 determines whether the calculated correlation score is greater than a pre-determined threshold correlation score. If the calculated correlation score is greater than the threshold correlation score, the event grouping unit 108 modifies the system log 132 to map the correlation at block 610. For example, the event grouping unit 108 links correlated log messages by writing an indicator bit in a respective index vector associated with the correlated messages. In some embodiments of the present invention, the modification of the system constitutes the basis of a knowledge graph. If the calculated correlation score is less than the threshold correlation score, correlation evaluation unit 106 determines that there is no correlation.

At block 612, the system 100 continues to analyze log messages as they are stored in the system log 132 within the scope determined at block 604.

Figure 7:
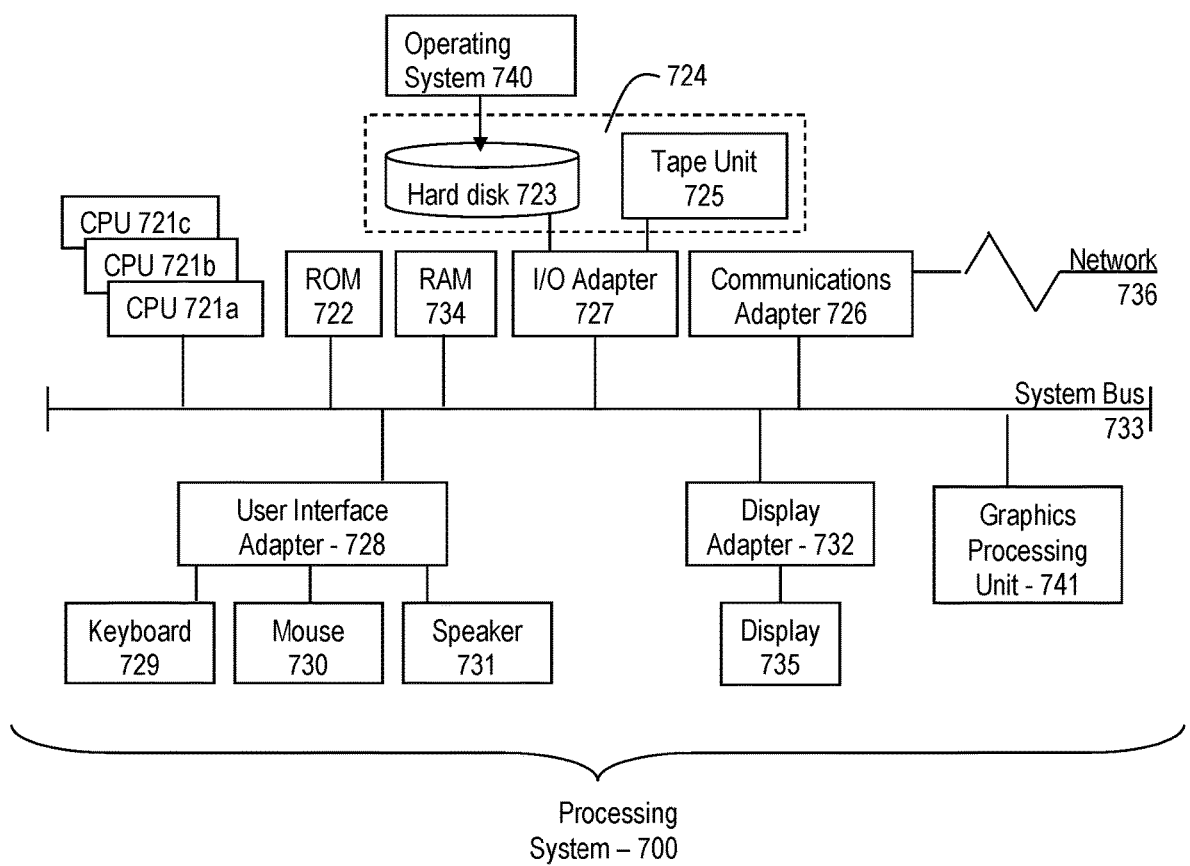
FIG. 7 illustrates a block diagram of a computer system for use in implementing one or more embodiments of the present invention.

It is understood that the present disclosure is capable of being implemented in conjunction with any other type of computing environment now known or later developed. For example, FIG. 7 depicts a block diagram of a processing system 700 for implementing the techniques described herein. In examples, the processing system 700 has one or more central processing units (processors) 721a, 721b, 721c, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of the processing system 700.

Further depicted are an input/output (I/O) adapter 727 and a network adapter 726 coupled to the system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to the system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to the system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. An input device 729 (e.g., a keyboard, a microphone, a touchscreen, etc.), an input pointer 730 (e.g., a mouse, trackpad, touchscreen, etc.), and/or a speaker 731 may be interconnected to system bus 733 via user interface adapter 728, which may include, for example, a Super I/O chip integrating multiple device adapters into a single integrated circuit In some aspects of the present disclosure, the processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing and has a highly parallel structure that makes it more effective than general-purpose CPUs for algorithms where processing of large blocks of data is done in parallel.

Thus, as configured herein, the processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in the processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a processor, whether a first log message written by an application during a first job is a message of interest based on a context of the first log message and a probability that the application writes the message for a same job as the first job;
   calculating, by the processor, in response to determining that the first log message is a message of interest, a correlation score based on intersecting tokens between the first log message and a second log message;
   determining, by the processor, the first log message correlates to the second log message based on comparing the score to a threshold score; and
   modifying, by the processor, a system log of a mainframe to link the first log message to the second log message based on the correlation.

2. The computer-implemented method of claim 1 further comprising determining the context of the first log message based on a semantic analysis of the first log message.

3. The computer-implemented method of claim 2, wherein determining the context further comprises traversing the first log message to detect keywords that suggest the first log message is a message of interest.

4. The computer-implemented method of claim 1 further comprising:
   calculating a number of instances that a token of the first log message appears in the first log message;
   calculating a number of instances that a token of the first log message appears in a set of log messages stored in the system log; and
   determining the context based in part on the calculations of the numbers of instances.

5. The computer implemented method of claim 1, wherein determining the correlation is further based on a context of the first log message.

6. The computer-implemented method of claim 1, wherein modifying the system log comprises writing an indicator bit to an index vector associated with the first log message, and wherein the indicator bit identifies the second log message.

7. The computer-implemented method of claim 1, wherein the determination of the context is performed as the mainframe is operating.

8. A system comprising:
   a memory having computer readable instructions; and
   one or more processors for executing the computer readable instructions, the computer readable instructions controlling the one or more processors to perform operations comprising:
   determining whether a first log message written by an application during a first job is an message of interest based on a context of the first log message and a probability that the application writes the message for a same job as the first job;
   calculating, in response to determining that the first log message is a message of interest, a correlation score based on intersecting tokens between the first log message and a second log message;
   determining the first log message correlates to the second log message based on comparing the score to a threshold score; and
   modifying a system log of a mainframe to link the first log message to the second log message based on the correlation.

9. The system of claim 8, the operations further comprising determining the context of the first log message based on a semantic analysis of the first log message.

10. The system of claim 9, wherein determining the context further comprises traversing the first log message to detect keywords that suggest the first log message is a message of interest.

11. The system of claim 8, the operations further comprising:
    calculating a number of instances that a token of the first log message appears in the first log message;
    calculating a number of instances that a token of the first log message appears in a set of log messages stored in the system log; and
    determining the context based in part on the calculations of the numbers of instances.

12. The system of claim 8, wherein determining the correlation is further based on a context of the first log message.

13. The system of claim 8, wherein modifying the system log comprises writing an indicator bit to an index vector associated with the first log message, and wherein the indicator bit identifies the second log message.

14. The system of claim 8, the operations further comprising, wherein the determination of the context is performed as the mainframe is operating.

15. A computer program product comprising a computer readable storage medium having program instructions embodied therewith, the program instructions executable by a processor to cause the processor to perform operations comprising:
    determining whether a first log message written by an application during a first job is a message of interest based on a context of the first log message and a probability that the application writes the message for a same job as the first job;
    calculating, in response to determining that the first log message is a message of interest, a correlation score based on intersecting tokens between the first log message and a second log message;
    determining the first log message correlates to the second log message based on comparing the score to a threshold score; and
    modifying a system log of a mainframe to link the first log message to the second log message based on the correlation.

16. The computer program product of claim 15, the operations further comprising determining the context of the first log message based on a semantic analysis of the first log message.

17. The computer program product of claim 16, wherein determining the context further comprises traversing the first log message to detect keywords that suggest the first log message is a message of interest.

18. The computer program product of claim 15, the operations further comprising:
    calculating a number of instances that a token of the first log message appears in the first log message;
    calculating a number of instances that a token of the first log message appears in a set of log messages stored in the system log; and
    determining the context based in part on the calculations of the numbers of instances.

19. The computer program product of claim 15, wherein determining the correlation is further based on a context of the first log message.

20. The computer program product of claim 15, wherein modifying the system log comprises writing an indicator bit to an index vector associated with the first log message, and wherein the indicator bit identifies the second log message.

* * * * *